United States Patent
Yuasa et al.

(10) Patent No.: US 7,485,352 B2
(45) Date of Patent: Feb. 3, 2009

(54) VACUUM HEAT INSULATOR AND APPARATUS USING THE SAME

(75) Inventors: Akiko Yuasa, Kyoto (JP); Shinya Kojima, Aichi (JP)

(73) Assignee: Panasonic Corporation, Osaka (JP)

( * ) Notice: Subject to any disclaimer, the term of this patent is extended or adjusted under 35 U.S.C. 154(b) by 510 days.

(21) Appl. No.: 10/562,545

(22) PCT Filed: Jun. 24, 2004

(86) PCT No.: PCT/JP2004/009295

§ 371 (c)(1),
(2), (4) Date: Dec. 29, 2005

(87) PCT Pub. No.: WO2005/003618

PCT Pub. Date: Jan. 13, 2005

(65) Prior Publication Data

US 2006/0159436 A1    Jul. 20, 2006

(30) Foreign Application Priority Data

| Jul. 4, 2003 | (JP) | 2003-191970 |
| Oct. 10, 2003 | (JP) | 2003-352024 |
| Jan. 28, 2004 | (JP) | 2004-019621 |

(51) Int. Cl.
 *B32B 18/00* (2006.01)
 *B32B 27/00* (2006.01)
 *B32B 33/00* (2006.01)
(52) U.S. Cl. ..................... 428/34.1; 428/35.7
(58) Field of Classification Search ............... None
See application file for complete search history.

(56) References Cited

U.S. PATENT DOCUMENTS

| 4,076,889 A * | 2/1978 | Sasaki et al. ............ 428/333 |
| 5,693,399 A * | 12/1997 | Himeshima et al. ........ 428/69 |
| 5,877,100 A | 3/1999 | Smith et al. |
| 5,989,371 A | 11/1999 | Nishimoto |
| 2003/0062190 A1* | 4/2003 | Kim et al. ............ 174/149 R |
| 2003/0134078 A1* | 7/2003 | Urata et al. .............. 428/69 |
| 2003/0215640 A1* | 11/2003 | Ackerman et al. ........ 428/405 |

FOREIGN PATENT DOCUMENTS

| JP | 58-64433 U | 4/1983 |
| JP | 62-258293 A | 11/1987 |
| JP | 2-127897 U | 10/1990 |

(Continued)

OTHER PUBLICATIONS

English language International Search Report for PCT/JP2004-009295, dated Oct. 12, 2004.

(Continued)

*Primary Examiner*—Ramsey Zacharia
(74) *Attorney, Agent, or Firm*—RatnerPrestia (57) ABSTRACT

A radiation heat transfer suppressor for inhibiting heat transfer by infrared rays is provided on the external surface of the enveloping member of a vacuum heat insulator. In heat-blocking or keep warm using a vacuum heat insulator, a surface having a radiation heat transfer suppressor is faced to a high-temperature side. Thus, the vacuum heat insulator exhibits excellent heat-insulating performance in a temperature range of 150° C. or higher.

8 Claims, 7 Drawing Sheets

FOREIGN PATENT DOCUMENTS

| | | | |
|---|---|---|---|
| JP | 5-280691 A | 10/1993 |
| JP | 10-238938 A | 9/1998 |
| JP | 11-213960 A | 8/1999 |
| JP | 2000-34557 A | 2/2000 |
| JP | 2000-86937 A | 3/2000 |
| JP | 2000-133416 A | 5/2000 |
| JP | 2000-266282 A | 9/2000 |
| JP | 2000-304293 A | 11/2000 |
| JP | 2001-008828 | 1/2001 |
| JP | 2001-265138 A | 9/2001 |
| JP | 2002-272606 A | 9/2002 |
| JP | 2003-74786 A | 3/2003 |
| JP | 2003-202100 A | 7/2003 |
| JP | 2003-271044 A | 9/2003 |

OTHER PUBLICATIONS

Japanese language International Preliminary Examination Report for PCT/JP2004/009295, dated Oct. 11, 2005.

* cited by examiner

VACUUM HEAT INSULATOR AND APPARATUS USING THE SAME

This application is a U.S. National Phase Application of PCT International Application PCT/JP2004/009295.

TECHNICAL FIELD

The present invention relates to a vacuum heat insulator and apparatuses using the vacuum heat insulator. It particularly relates to heat insulation and keep warm in apparatuses having high-temperature portions, including printing machines such as a copying machine and laser printer, electronic equipment such as a computer, and further a water heater.

BACKGROUND ART

Energy saving has recently been desired because of the importance of preventing global warming, one of concerns over global environment. In every field, energy saving is promoted. Required for general equipment using heat or cold and members related to houses is a heat-insulating member having excellent heat-insulating performance in low- or medium-temperature areas ranging from −30 to 150° C., from the viewpoint of efficient use of heat. On the other hand, business equipment, such as a computer, printing machine, and copying machine, has a heating element in its inside. To prevent the heat from conducting from the heating element to toners or internal precision components susceptible to heat, a high-performance heat-insulating member capable of being used at temperatures around 150° C. is strongly desired.

Among general heat-insulating members used in a temperature range around 150° C., a vacuum heat insulator is used for applications requiring a heat-insulating member having higher performance. A vacuum heat insulator is structured so that a core holding a space made by minute voids is covered with an enveloping member for shielding entry of ambient air and the space is evacuated.

As the enveloping member of a vacuum heat insulator, a case of a heat-sealed metal can be used. In a low-temperature area requiring no heat resistance, a plastic-metal laminated film having a heat-seal layer, gas barrier layer, and protective layer, which is relatively easily bent and curbed, is often used as an enveloping member. Materials of the core include powders, fibers, and open-cell foams.

In recent years, there have been wider-ranging demands for vacuum heat insulators. Accordingly, vacuum heat insulators with much higher performance are required. To improve heat insulation by blocking the impact of radiation, a vacuum heat insulator using a calcium silicate mold including a radiant heat shield as a core is disclosed in Japanese Patent Unexamined Publication No. 10-160091. Also, to improve heat insulation, a vacuum heat insulator that uses granulated composition to which inorganic gel components and an infrared opaquer are added as a core is disclosed in Japanese Translation of PTC Publication No. 2001-502367. Disclosed in Japanese Patent Unexamined Publication No. 62-258293 is a technique in which a proper quantity of a synthetic resin film having a metal deposition surface formed thereon is mixed in powdered heat insulator so that the synthetic resin film intersects and opposes the direction in which heat permeates.

However, the infrared ray, i.e. a factor of radiant heat, is absorbed when it reaches the enveloping member on the surface of a vacuum heat insulator and, converted into heat energy to generate a state of solid heat conduction. For this reason, extremely little of the infrared ray reaches the core. Therefore, to improve heat insulation at temperatures around 150° C., suppression of transfer of radiant heat is necessary. The structures of these conventional techniques cannot address these problems sufficiently.

SUMMARY OF THE INVENTION

A vacuum heat insulator of the present invention includes a core, an enveloping member covering the core, and a radiation heat transfer suppressor disposed on the surface of the enveloping member on a high temperature side thereof. The inside of the enveloping member is evacuated. This structure prevents infrared ray in the vacuum heat insulator to be absorbed and suppresses radiation heat transferred to the surface of the enveloping member. Thus, heat-insulating performance is improved. The radiation heat transfer suppressor can be provided away from the surface of the enveloping member.

DETAILED DESCRIPTION OF PREFERRED EMBODIMENTS

Figure 1:
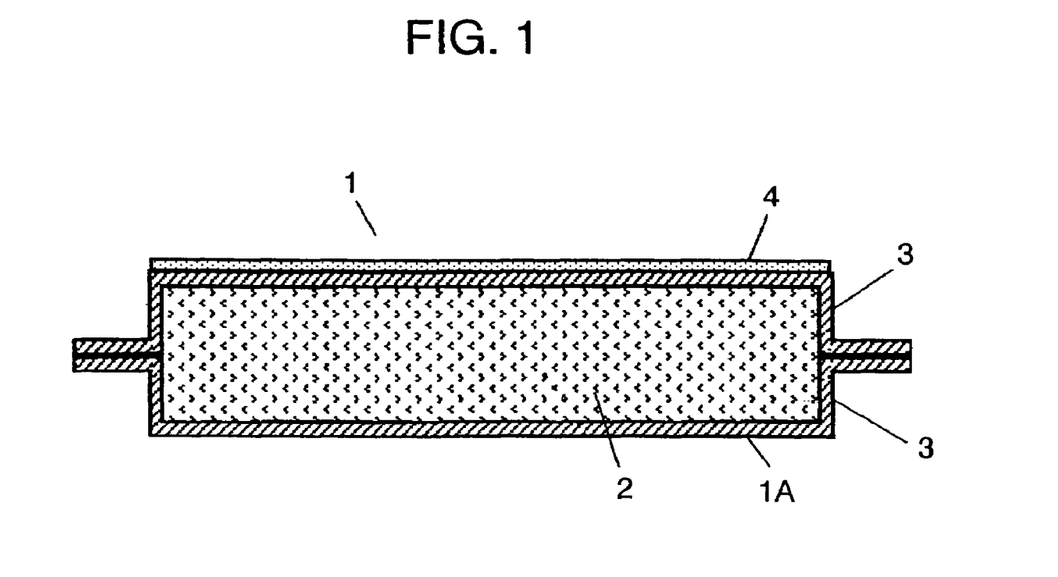
FIG. 1 is a sectional view of a vacuum heat insulator in accordance with an exemplary embodiment of the present invention.
Figure 2:
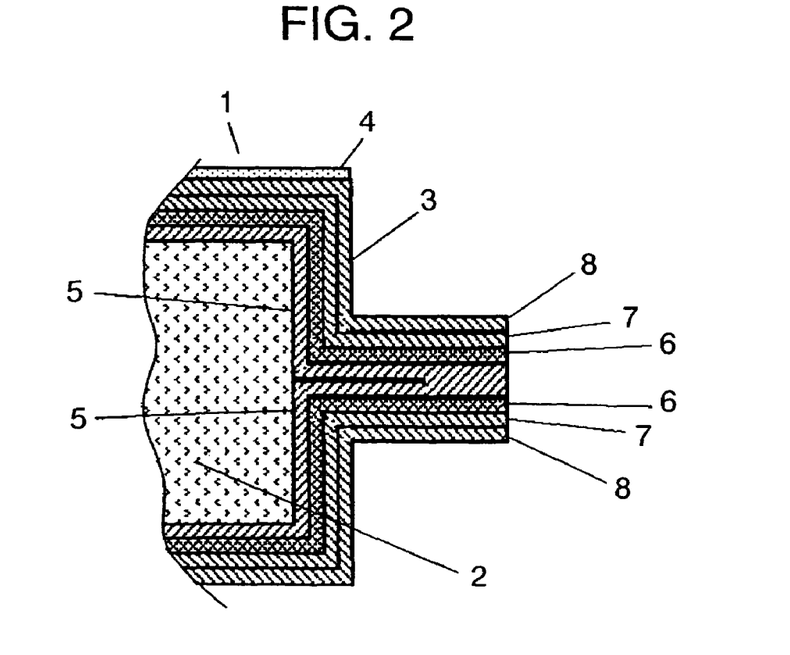
FIG. 2 is a sectional view of an essential part showing a fin of the vacuum heat insulator of FIG. 1.

FIG. 1 is a sectional view of a vacuum heat insulator in accordance with an exemplary embodiment of the present invention. FIG. 2 is a sectional view of an essential part showing a fin of the vacuum heat insulator.

In vacuum heat insulator 1, two sheets of enveloping member 3 facing to each other cover core material 2. The inside of enveloping member 3 is evacuated almost to a vacuum and the periphery thereof is heat-sealed. A glass wool mold is used for core 2.

Each sheet of enveloping member 3 has a laminated structure composed, from the inside, of heat seal layer 5, gas barrier layer 6, first protective layer 7, and second protective layer 8. For example, polychlorotrifluoroethylene (50-µm-thick) having a melting point of 210° C. is used for heat seal layer 5. For gas barrier layer 6, 6-µm-thick aluminum foil is used. For first protective layer 7, polyethylenenaphthalate (12-µm-thick) having a melting point of 270° C. is used. For second protective layer 8, tetrafluoroethylene-ethylene copolymer (25-µm-thick) having a melting point of 260° C. is used.

As described above, heat seal layer 5 is made of a resin film having a melting point of 200° C. or higher. Melting points of gas-barrier layer 6, protective layers 7 and 8 is higher than that of heat seal layer 5. Heat seal layer 5, gas barrier layer 6, and protective layers 7 and 8 are flame-retardant films compliant with VTM-2 or higher of UL 94 standard.

Heat insulator 1A is made of such core 2 and enveloping member 3. In fabrication of vacuum heat insulator body 1A, two sheets of enveloping member 3 are faced so that heat seal layers 5 are in contact with each other, and three sides are heat-sealed to form a bag into which core 2 is inserted. Sealing configurations of the bag include a four-sided seal type, gusset bag type, three-sided seal type, pillow case type and center tape seal type. However, sealing configurations of the bag are not limited to these. Core 2 is inserted into the bag of enveloping member 3, its inside is evacuated to a pressure of 10 Pa, and the remaining one side is heat-sealed to fabricate vacuum heat insulator body 1A.

On the surface of enveloping member 3 on the high-temperature side when vacuum heat insulator 1 is placed, radiation heat transfer suppressor 4 is formed in various configurations. In other words, radiation heat transfer suppressor 4 is structured of a film for a coating including infrared reflection components and a film for suppressing radiation heat transfer. Further, this film is structured of either of alternately laminated inorganic films having different reflectances with each other, metal foil, and a resin substrate having a metal deposition film formed thereon. A description is provided of an example of radiation heat transfer suppressor 4 with reference to the accompanying drawings.

FIRST EXEMPLARY EMBODIMENT

First, a description is provided of a case in which a coating including an infrared reflectance component is formed as radiation heat transfer suppressor 4. For samples 1 through 4, various kinds of coatings are formed on the surface of enveloping member 3 of vacuum heat insulator body 1A as radiation heat transfer suppressor 4. The heat-insulating performance of vacuum heat insulator 1 is evaluated by measuring the surface temperature on the low-temperature side when a heat at 150° C. is applied to the surface on the high-temperature side.

Formed in sample 1 is a coating containing leafing aluminum flake pigment, i.e. a metal powder, as an infrared reflectance component and epoxy resin as a resin component. Formed in sample 2 is a coating containing leafing aluminum flake pigment, similar to sample 1, and polychlorotrifluoroethylene, i.e. a fluorocarbon resin, as a resin component. Formed in sample 3 is a coating containing silicon nitride, i.e. an inorganic powder, as an infrared reflectance component, and polychlorotrifluoroethylene, i.e. a fluorocarbon resin, as a resin component. Formed in sample 4 is a coating containing titanium oxide powder, i.e. a metal oxide powder, as an infrared reflectance component, and polychlorotrifluoroethylene. i.e. a fluorocarbon resin, as a resin component. Additionally, for comparison, vacuum heat insulator body 1A having no coating is prepared. The measurement results are shown in Table 1.

TABLE 1

| Sample No. | Infrared reflectance component | Resin component | Surface temperature on low-temperature side |
|---|---|---|---|
| 1 | Leafing aluminum flake | Epoxy resin | 60° C. |
| 2 | Leafing aluminum flake | Polychlorotrifluoroethylene | 58° C. |
| 3 | Silicon nitride | Polychlorotrifluoroethylene | 56° C. |
| 4 | Titanium oxide | Polychlorotrifluoroethylene | 54° C. |
| Substrate 1A | None | None | 80° C. |

As obvious from Table 1, the heat-insulating performance of samples Nos. 1 through 4 has largely been improved in comparison with the case in which no coating is formed on vacuum heat insulator body 1A. In other words, the reflection of the infrared reflection components in coatings formed on the surface of enveloping member 3 on the high-temperature side prevents absorption of the infrared ray in vacuum heat insulator 1. Suppression of radiation heat transferred onto the surface of vacuum heat insulator 1 improves heat-insulating performance. The coating can easily be provided uniformly on radiation heat transfer suppressor 4 even when the surface of body 1A is non-flat or non-uniform. This can provide excellent productivity and exert effects of suppressing radiation heat transfer.

The metal powder used for a coating of radiation heat transfer suppressor 4 has a low emissivity and excellent effects in infrared reflection capability. This effectively suppresses radiation heat transferred to the surface of vacuum heat insulator 1, thus improving heat-insulating performance. As a metal powder, any materials having functions of direct reflection and distribution of infrared rays can be used. Among those, at the view point of improving heat-insulating effects, it is desirable that the reflectance especially in a wavelength ranging from 2 to 25 µm is at least 20%, more preferably at least 50%. Materials having smaller emissivity, such as flake aluminum powder, similar silver powder and copper powder, are desirable because they have larger infrared reflection effects.

Additionally, it is preferable that the thickness of the coating ranges from 1 to 100 µm. More preferably, it ranges from 10 to 50 µm. With a thickness less than 1 µm, the effect is insufficient; with a thickness over 100 µm, the coating may peel off. In formation of the coating, a primer layer and overlay can be formed in some applications of vacuum heat insulator 1.

The surface temperature on the lower-temperature side of sample 2 is 2° C. lower than that of sample 1. This is thought because, in the use of a fluorocarbon resin having a relatively smaller range of absorption wavelengths in an infrared range from 2 to 5 µm as a resin component, absorption of heat rays by resin components in the coating suppresses an increase in solid heat conduction. Because the melting point of the fluorocarbon resin is 200° C. or higher, resin components do not melt even at high temperatures of approx. 150° C. For this reason, excellent effects of suppressing radiation heat transfer are exerted for an extended period of time. In other words, it is preferable that the coating has a resin component of 200° C. or higher. When ambient temperature at which vacuum heat insulator 1 is used is set to 50K lower than the melting point of the resin component, a resin component having a melting point of 200° C. or higher does not melt out even at high temperatures of approx. 150° C. This structure can exert excellent effects of suppressing radiation heat and provide excellent heat-insulating performance.

Fluorocarbon resins having a relatively small range of infrared absorption wavelength can be used. Such fluorocarbon resins include polychlorotrifluoroethylene, tetrafluoroethylene-ethylene copolymer, and tetrafluoroethylene-hexafluoropolypropylene copolymer. These fluorocarbon resins have melting points of 200° C. or higher.

In sample 3, the temperature on the low-temperature side of sample 3 is 2° C. lower than that of sample 2. Because inorganic powders also reflect infrared rays, the radiation heat transferred onto the surface of vacuum heat insulator 1 is effectively suppressed, and thus the heat-insulating performance is improved. Also, because the solid heat conductivity of silicon nitride, i.e. the inorganic powder, is lower than those of metals, an increase in the solid heat conductivity is suppressed.

As inorganic powders used for the coating, those known can be used if they have an infrared ray reflection function. Various kinds of inorganic particles, such as glass bead, nitrides such as boron nitride and titanium nitride, hydroxides such as iron hydroxide, aluminum hydroxide, and magnesium hydroxide, and sulfides such as cupper sulfide and zinc sulfide, can be used. Among these inorganic particles, those having low solid heat conductivities are preferable.

In sample 4, the surface temperature on the low-temperature side is 2° C. lower than that of sample 4. This is because the effect of scattering is added to the relatively small solid heat conductivity of titanium oxide powder, i.e. a metal oxide powder as the infrared ray reflection component. In other words, because metal oxides have effects of scattering and reflecting infrared rays, the radiation heat transferred onto the surface of vacuum heat insulator 1 is effectively suppressed and heat-insulating performance is improved.

As metal oxide powders used for the coating, any materials capable of reflecting and scattering infrared rays can be used. Iron oxide, tin oxide, zirconium oxide, titanium oxide, manganese oxide, barium titanate, ferric chromate, antimony-doped tin oxide, tin-doped indium oxide, and the like can be used. Among metal oxide powders, those having low solid heat conductivities are preferable.

Any known coating composition may be included in the coating if it contains infrared reflection components. In some applications, two or more kinds of metal powders, inorganic powders, and metal oxide powders can be mixed properly.

SECOND EXEMPLARY EMBODIMENT

Next, a description is provided of radiation heat transfer suppressor 4 formed of a laminate of inorganic material films having different reflectances. The basic structure of the vacuum heat insulator is similar to those of FIGS. 1 and 2 in accordance with the first exemplary embodiment.

Figure 3:
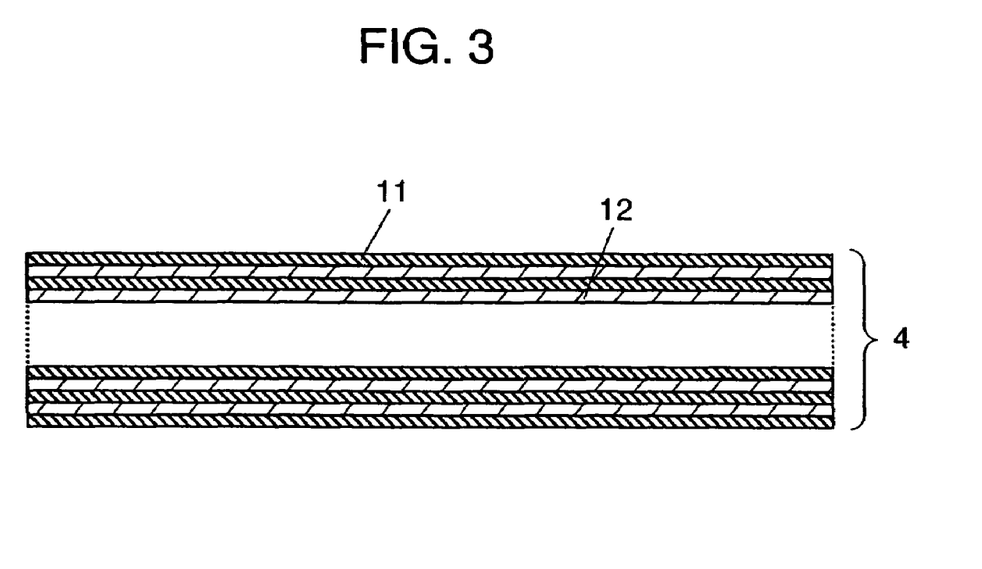
FIG. 3 is an enlarged sectional view of a radiation heat transfer suppressor in the vacuum heat insulator of FIG. 1.

FIG. 3 is a sectional view of radiation heat transfer suppressor 4 in accordance with this embodiment. Radiation heat conduction suppressor 4 of this embodiment is a radiation heat suppressing film in which first inorganic film 11 made of magnesium fluoride and second inorganic film 12 made of calcium fluoride and having a different reflectance are alternately laminated in four layers.

When inorganic material films having different reflectances are alternately laminated in a thickness of the quarter of a specific wavelength, fronts of the waves reflected from the boundary surfaces of respective layers overlap additively. This allows the wavelength of far infrared rays to selectively reflect. Now, the specific wavelength shows a wavelength in the vicinity of providing maximum emissivity at a heat-insulating temperature. The specific wavelength varies with applicable temperatures. At 150° C., for example, the specific wavelength ranges from 4 μm to 10 μm. Setting the specific wavelength effectively can prevent absorption of infrared rays, effectively suppress radiation heat transferred to the surface of vacuum heat insulator 1, and improve its heat-insulating performance.

Vacuum heat insulator 1 structured as above reflects most of the infrared rays generated from the heat source at radiation heat transfer suppressor 4 provided on the surface of vacuum heat insulator 1. This reflection prevents infrared rays from being absorbed by protective layer 9 of enveloping member 6, thus generating no heat leak. As a result, the heat conductivity caused by radiation transfer is reduced and the heat conductivity of vacuum heat insulator 1 is reduced.

In this embodiment, a radiation heat suppressing film is structured by alternately laminating magnesium fluoride and calcium fluoride. To make maximum use of reflection on the boundary surfaces, a film having another reflectance can be laminated, and the materials of the film is not specifically limited. The materials include magnesium fluoride, calcium fluoride, lithium fluoride, barium fluoride, thallium bromo-iodide, thallium bromo-chloride, sodium chloride, potassium bromide, potassium chloride, silicon oxide, cesium iodide, zinc selenide, and the like.

The thickness of the film is not specified. However, a smaller thickness reduces shock resistance; a larger thickness increases the solid heat conductivity as a vacuum heat insulator. For this reason, in formation of a radiation heat suppressing film by deposition, such as physical vapor deposition (PVD) method and chemical vapor deposition (CVD) method, it is preferable that the thickness of the film ranges from 5 nm to 10 μm.

Considered methods of forming the radiation heat suppressing film include sputtering, deposition, PVD method, CVD method, or electrode position methods on enveloping member, or bonding a film thereon by an adhesive. However, the method of forming a film is not specified. The film may be laminated together with a thin layer made of inorganic materials or semiconductors.

In addition to an inorganic material film laminate, a fluorocarbon resin film can be laminated. Fluorocarbon resins absorb a smaller number of wavelengths in the wavelength range of infrared rays (2 to 25 μm), i.e. heat rays, and do not absorb infrared rays. As a result, infrared rays are transferred to the inorganic material film laminate, similar to the case of the first exemplary embodiment. The inorganic material film laminate reflects the infrared rays. This reflection suppresses absorption of infrared rays on the surface of vacuum heat insulator body 1A, thus improving heat-insulating performance. Additionally, providing a fluorocarbon resin on the outermost layer of radiation heat transfer suppressor 4 increases the durability of heat radiation conduction suppressor 4. This mechanism also applies to the third exemplary embodiment, which will be described below.

THIRD EXEMPLARY EMBODIMENT

Next, a description is provided of a case in which radiation heat transfer suppressor 4 is formed of a metal film. The basic structure of the vacuum heat insulator is similar to those of FIGS. 1 and 2 in accordance with the first exemplary embodiment.

In this embodiment, a metal film forming radiation heat transfer suppressor 4 is made of a metal foil or laminating them. Alternatively, as shown in the sectional view of FIG. 4, the metal film can be made of a thin layer of metal film 13 formed by deposition, sputtering, or electrode position method, or a laminate thereof. The metal film can also be made by laminating a metal film with thin layers of inorganic materials or semiconductors.

Figure 5:
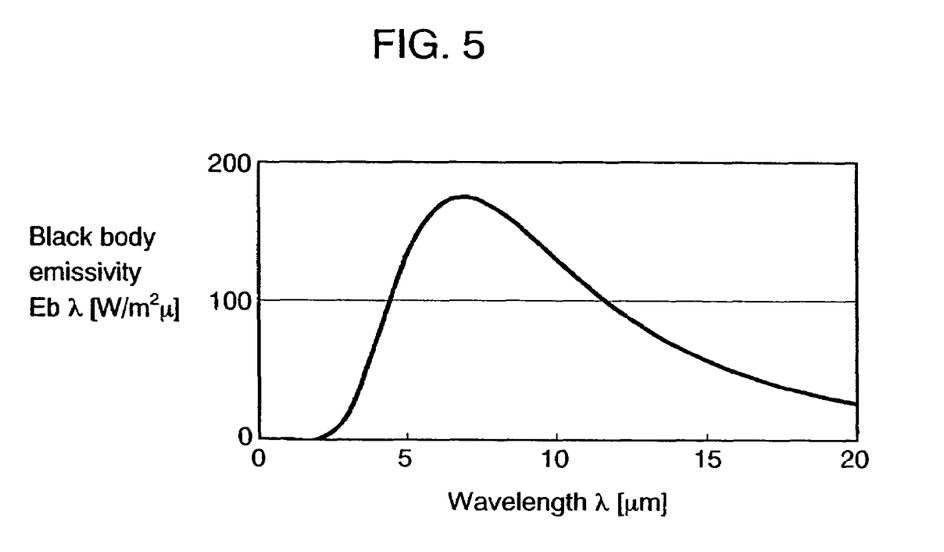
FIG. 5 is a characteristics diagram showing a relation between wavelengths and black body emissivity at 150° C.
Figure 6:
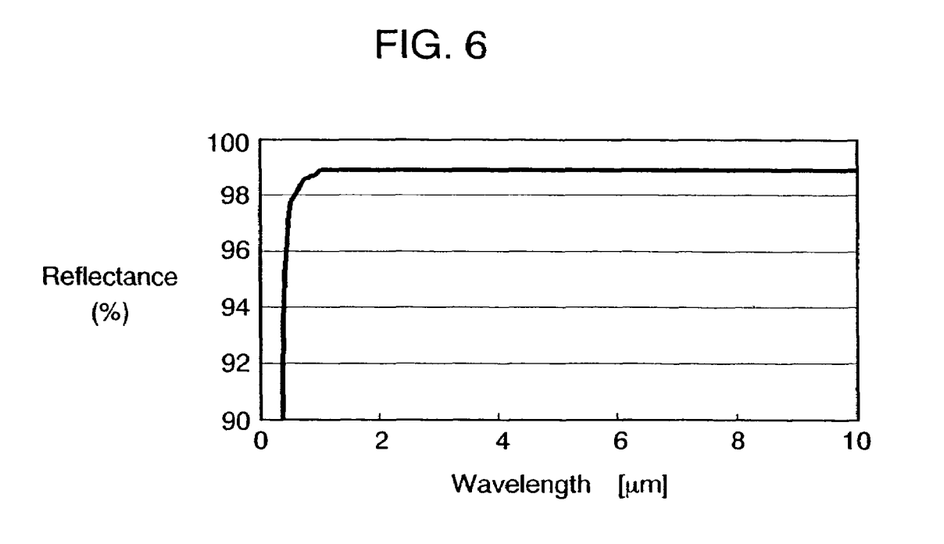
FIG. 6 is a characteristics diagram showing reflectance when light is perpendicularly incident on a silver-deposited surface.

FIG. 5 is a characteristics diagram showing a relation between black body emissivity and wavelengths at 150° C. FIG. 6 is a characteristics diagram showing reflectance when light is perpendicularly incident on a silver (Ag)-deposited surface.

When a heat at 150° C. is applied to the surface of vacuum heat insulator 1 on the high-temperature side, the relation between wavelength λ and radiation emissivity Ebλ follows the Planck low, the wavelengths generated from the heat source of 150° C. are concentrated on the far infrared area as shown in FIG. 5. Under this assumption, the reflectance when light is perpendicularly incident to the Ag-deposited surface is shown in FIG. 6, the reflectance in the far infrared area are extremely high at 99%. On the other hand, in vacuum heat insulator body 1A having no radiation heat transfer suppressor 4, protective layers 7 and 8 absorb far infrared rays to generate heat. For this reason, there is a large difference in heat-insulating performance. In this manner, metal films have high reflectances, thus effectively reflecting infrared rays. This reflection effectively prevents absorbs of infrared rays in vacuum heat insulator body 1A and inhibits radiation heat transferred on the surface of vacuum heat insulator body 1A. These effects improve heat-insulating performance.

In the above description, Ag is used as the metal. However, any kind and thickness of materials having an infrared ray reflection function, such as gold (Au), aluminum (Al), and cupper (Cu), can be used. When the reflectance in a wavelength area ranging from 2 to 25 μm is 20% or larger, the heat-insulating performance improves. Preferably, at a reflectance of 50% or larger, a synergistic effect with vacuum heat insulator body 1A can provide a larger heat-insulating performance.

The thickness of the film is not specified. A smaller thickness reduces shock resistance; a larger thickness increases the solid heat conductivity as a vacuum heat insulator. Thus, preferably, the thickness of the film ranges from 5 nm to 10 μm when the film is formed by a gas phase method, such as deposition. Preferably, the thickness of the film ranges from 1 μm to 30 μm when the film is formed by laminating metal foils. Preferably, the thickness of the metal foil ranges from 1 μm to 100 μm, and more preferably, from 10 μm to 50 μm. At a foil thickness smaller than 1 μm, insufficient strength causes difficulty in handling. At a thickness of 100 μm or larger, infrared ray reflection effects reach saturation. At a thickness of 100 μm or larger, the solid heat conductivity may increase when the film is placed in contact with vacuum heat insulator body 1A.

Figure 4:
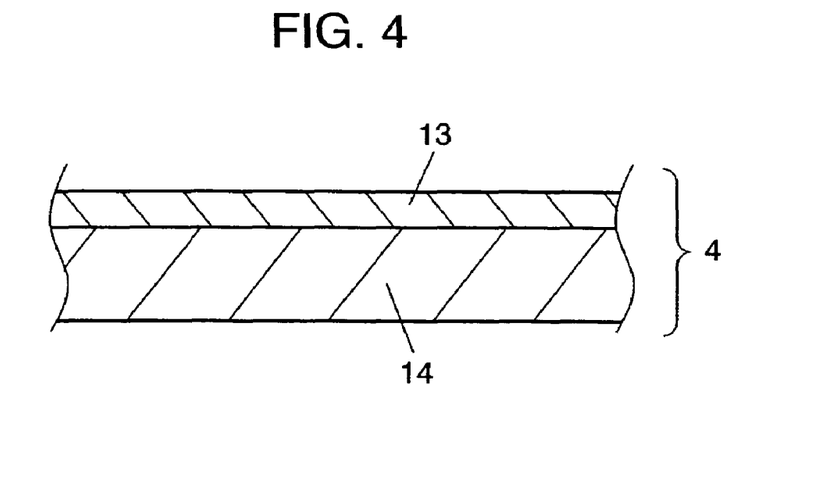
FIG. 4 is an enlarged sectional view of another radiation heat transfer suppressor in the vacuum heat insulator of FIG. 1.

Considered as a method of forming metal film 13 is sputtering or deposition on enveloping member 3, or bonding a film by an adhesive. However, the method of forming a film is not specified.

When oxidization of the surface or weather resistance of the metal film causes some troubles, a layer made of a fluorocarbon resin can be formed on the surface of the metal film. Specific examples are given below.

First, metal foils are placed as radiation heat transfer suppressor 4. The results obtained by changing the kinds of metal foils are shown in samples 5 to 7.

Used as core 2 in these samples are uniformly mixed powders of dry fumed silica and 5 wt % of carbon black sealed in a gas-permeable non-woven fabric bag. In enveloping member 3, polychlorotrifluoroethylene (50 μm-thick) having a melting point of 210° C. is used for heat seal layer 5, aluminum foil (6 μm-thick) is used for gas barrier layer 6, polyethylenenaphthalate (12 μm-thick) having a melting point of 270° C. is used for a first protective layer 7, and tetrafluoroethylene-ethylene copolymer (25 μm-thick) having a melting point of 260° C. is used for second protective layer 8. In sample 5, as radiation heat transfer suppressor 4, a cupper foil is used. In sample 6, an aluminum foil is used. In sample 7, a nickel foil is used.

Similar to the first exemplary embodiment, the results of evaluating heat-insulating performance are shown in Table 2.

TABLE 2

| Sample No. | Metal foil | Surface temperature on low-temperature side |
| --- | --- | --- |
| 5 | Copper foil | 45° C. |
| 6 | Aluminum foil | 40° C. |
| 7 | Nickel foil | 42° C. |
| Body 1A | None | 80° C. |

As obvious from Table 2, in samples 5 to 7, heat-insulating performance is larger than that of the case structured like sample 5 without no metal foil placed on vacuum heat insulator body 1A (body 1A).

In sample 6, the temperature is 5° C. lower than that of sample 5. In sample 7, the temperature is 3° C. lower and the heat-insulating performance is larger than those of sample 5. This is because the infrared reflectance of an aluminum foil is 0.75 and the infrared reflectance of a nickel foil is 0.65, which are more excellent than that of a cupper foil, i.e. 0.55. Additionally, having more excellent corrosion resistance than those of aluminum and cupper the nickel foil exhibits stable effects of suppressing radiation heat transfer for an extended period of time.

Next, a film having metal deposition on a resin substrate is placed as radiation heat transfer suppressor 4. The results obtained by changing the kinds resin substrate and deposited metal are shown in samples 8 to 11. Core 2 and enveloping member 3 are the same as those of sample 5. In sample 8, as a metal deposition film, polyethyleneterephthalate (PET) film is used for a resin substrate and aluminum is deposited thereon. In sample 9, as a metal deposition film, polyphenylene sulfide (PPS) film is used for a resin substrate and aluminum is deposited thereon. In sample 10, as a metal deposition film, tetrafluoroethylene-ethylene copolymer (PTFE-PE) film is used for a resin substrate and aluminum is deposited thereon. In sample 11, as a metal deposition film, PTFE-PE film is used for a resin substrate and nickel is deposited thereon.

Similar to the first exemplary embodiment, the results of evaluating heat-insulating performance are shown in Table 3.

TABLE 3

| Sample No. | Deposited Metal | Resin substrate | Surface temperature on low-temperature side |
| --- | --- | --- | --- |
| 8 | Aluminum | PET | 44° C. |
| 9 | Aluminum | PPS | 44° C. |
| 10 | Aluminum | PTFE-PE | 42° C. |
| 11 | Nickel | PTFE-PE | 44° C. |
| Body 1A | None | None | 80° C. |

As obvious from Table 3, in samples 8 to 11, heat-insulating performance is larger than that of the case structured like sample 8 without any metal deposition film placed on vacuum heat insulator body 1A. Because the melting points of the resin substrates are 200° C. or higher, the resin substrates do not melt out even in a high-temperature atmosphere of approx. 150° C. This advantage can exert excellent effect of suppressing heat radiation and provide excellent heat-insulating performance.

Metals, such as aluminum, nickel, cupper, gold, and silver, can be deposited. In the view point of improving heat-insulating effects, it is preferable that the infrared reflectance in a wavelength ranging from 2 μm to 25 μm is 20% or higher. Desirably, it is 50% or higher. Any resin substrate at temperatures and under conditions in the metal deposition process can be used, without special limitation. PET film, PPS film, and various kinds of fluorocarbon films can be used.

Methods of heating metals to an atomic state suitable for deposition are used for deposition under a reduced pressure or normal pressure. The heating methods are not specified; however, high-frequency wave application, electron beam, laser, or other methods can be used.

Generally, metal deposition films have high reflectance of infrared rays, higher flexibility than metal foils, and higher handling property. For these reasons, metal deposition films have high productivity, exert higher effects of suppressing radiation heat, and provide a vacuum heat insulator having excellent heat-insulating performance.

In sample 8, because the radiation heat suppressor exceeds a temperature of 105° C., which is the relative temperature index value (UL746B) of the PET film, under conditions of radiation at 150° C., the radiated surface is slightly shrunken by softening. In contrast, the radiated surface is not shrunken by softening even in radiation at 150° C. in sample 9, and appearance is improved. This is because the melting point of the PPS film is 285° C., and the relative temperature index value (UL 746B) is 160° C., and thus the sample has an excellent heat-resisting function. Having a melting point of 285° C. and extremely excellent heat-resisting function, the PPS film is not softened or shrunken even under conditions at temperatures around 150° C. For this reason, the PPS film exerts excellent effects of suppressing radiation heat for an extended period of time and provides a vacuum heat insulator having excellent heat-resisting performance. Additionally, as a general engineering plastic resin substrate, the PPS film is often used for metal deposition, relatively inexpensive, and excellent in appearance.

For sample 10, the surface temperature on the low-temperature side is 42° C., which is 2° C. lower than that of sample 8. In sample 10, a PTFE-PE film having a relatively small range of absorption wavelengths in an infrared ray area is used as a resin component. It is considered that this film suppresses an increase in solid heat conduction caused by absorption of heat rays in resin components contained in the substrate.

In radiation at 150° C., the radiated surface is not shrunken by softening and the appearance is improved. This is because the PTFE-PE film has a melting point of 260° C. and the relative temperature index value of 150° C. (UL 746B), and thus has an excellent heat-resisting function. Having corrosion and chemical resistance together with heat resistance, the fluorocarbon resin film exerts excellent effects of suppressing heat radiation for an extended period of time and provides excellent heat-insulating performance even under sever conditions of use, such as high humidity.

For sample 11, the surface temperature on the low-temperature side is 44° C. and the performance similar to that of sample 8 is provided. The sample 11 has higher corrosion resistance than that of aluminum deposition and exhibits stable effects of suppressing radiation heat transfer for an extended period of time.

FOURTH EXEMPLARY EMBODIMENT

Next, a description is provided of the effect of a core, using a vacuum heat insulator with a coating of radiation heat transfer suppressor 4, as an example.

First, a vacuum heat insulator with a coating is described. The basic structure of the coating is similar to that of sample 2 in accordance with the first exemplary embodiment. Core 2 and enveloping member 3 are also the same as those in the first embodiment.

Materials capable of holding a space as core 2 of vacuum heat insulator 1, such as fiber materials, e.g. glass wool and rock wool, powder materials, e.g. wet silica, dry silica and zeolite, and open-cell foams can be used as core 2. In consideration of use at high temperatures, powder materials having minute voids are suitable.

For sample 12, dry humed silica sealed into an air-permeable non-woven fabric bag is used as core 2. For sample 13, a uniformly mixed powder of dry humed silica and 5 wt % of carbon black added thereto is prepared, and sealed into an air-permeable non-woven bag. Used for sample 14 is a molded mixture of powders and fabric material, i.e. dry humed silica, 5 wt % of carbon black, and 10 wt % of glass wool.

Similar to the first exemplary embodiment, the results of evaluating heat-insulating performance of vacuum heat insulation 1 are shown in Table 4.

TABLE 4

| Sample No. | Core | Surface temperature on low-temperature side |
|---|---|---|
| 12 | Dry humed silica | 58° C. |
| 13 | Dry humed silica + carbon black | 48° C. |
| 14 | Dry humed silica + carbon black + glass wool | 60° C. |
| Body 1A | Dry humed silica | 80° C. |
| 2 | Glass wool | 58° C. |

Body 1A in Table 4 is a vacuum heat insulator having dry humed silica as core 2, and no coating formed thereon. As obvious from Table 4, in every sample other than body 1A, the surface temperature on the low-temperature side is lower than that of body 1A. This is because leafing aluminum flake pigment reflects infrared rays and thus suppresses absorption of the heat of infrared rays. Sample 12 has performance similar to sample 2 which has the same structure except for glass wool as core 2.

For sample 13, the surface temperature on the low-temperature side is 10° C. lower than that of sample 12. This considerably improves heat-insulating performance. Carbon black, an electrically conductive powder, is considered to disaggregate agglomerated particles of humed silica to reduce the void diameter of core 2. As a result, effects of decreasing gas heat conductivity and effects of reducing solid heat conductivity caused by reduction in contact areas of fined individual particles provide excellent heat-insulating effects. For this reason, this material is particularly preferable to be used under high-temperature conditions of large movement of air molecules.

Dry silica is specified because it has excellent effects in which electrically conductive powders disaggregate agglomerated particles, and exert more excellent heat-insulating effects by pulverization. For sample 13, the degree in which temperature increase reduces the heat-insulating performance and the degree in which an increase in the internal pressure of the vacuum heat insulator reduces the heat-insulating performance are higher than those in use of general core materials, such as glass wool. Because the disaggregated agglomerated particles form the void diameters in the inner layers, the void diameters are extremely small. As a result, it is considered that an increase in kinetic momentum of air molecules caused by increases in temperature and pressure is suppressed, and deterioration of gas heat conductivity is prevented. These advantages provide heat-insulating performance around 150° C. and improve reliability with time.

As dry silica used for core 2, silicon oxide compounds having a various kinds of grain diameters produced by dry process, e.g. silicate by the arc process, and silicate by thermal decomposition, can be used. Such dry silica has relatively weak electrostatic force between agglomerated particles and large effects of disaggregating agglomerated particles when electrically conductive powders are added. Because of its excellent heat-insulating performance, those having a primary grain diameter up to 50 nm are preferable. Especially when a high heat-insulating performance is necessary, those having a primary grain diameter up to 10 nm are desirable.

Dry silica having various kinds of grain sizes can also be used. For example, products out of the normal lots of which grain sizes are not controlled between those of product A and product B both having the specified grain sizes can be used. Generally, these products can be obtained at a lower cost.

Any powder having electrical conductivity can be used as electrically conductive powders of core 2. As a general measure, powders having a powder specific resistance, i.e. a measure of conductivity, up to $1 \times 10^{13} \Omega/cm$ are preferable. Preferable materials in inorganic powders include metal oxide powders, carbonate powders, chloride powders, and carbon powders. Preferable materials in organic powders include metal-doped powders. It is more preferable that the powder specific resistance is up to $1 \times 10^{8} \Omega/cm$. When higher heat-insulating performance is required, it is preferable that the powder specific resistance is up to 10 $\Omega/cm$. When carbon powders are used as a conductive powder, its powder specific resistance is small and ranges from 0.1 $\Omega/cm$ to 5 $\Omega/cm$. The carbon powders have excellent effects of disaggregating agglomerated particles of dry silica and improving heat-insulating performance. The carbon powders are extremely useful, because of its industrial low cost.

In consideration of a uniform mixture of the powder with the base material, it is preferable that the diameters of the particles are smaller. Further, it is desirable that the content of conductive powders is up to 60 wt %. When the content exceeds 60 wt %, the solid heat conduction of the conductive powder has a larger influence and may degrade the performance of the heat-insulating member. The appropriate amount of addition varies with the kinds of powders to be added. Even with addition of 60% or more, the effect reaches saturation in many cases. Thus, the appropriate content of the conductive powders is up to 60 wt %. More desirably, it is up to 45 wt %.

In sample 14, the surface temperature on the low-temperature side is 60° C. However, because core 2 is molded, the sample has higher handling property than sample 12. In other words, because glass wool works as an aggregate, a heat-insulating molded body can easily be formed by general compression molding. Additionally, filling powders into a non-woven bag is unnecessary and thus material costs and production costs can be reduced. Because the core is molded, it does not generate powdery dust. This advantage prevents the adhesion of powders to the sealing opening and inhibition of sealing property when the core is inserted into enveloping member 3 and sealed under a reduced pressure. This advantage also prevents gradual entry of air into the heat insulator (slow leak). Thus, the reliability of vacuum heat insulator 1 can be ensured for an extended period of time.

Incidentally, moisture absorbent or gas absorbent can be sealed together with core 2 to absorb little gas. Moisture absorbents and gas absorbents include physical absorbents such as synthetic zeolite, activated carbon, active alumina, silica gel, dowsonite and hydrotalcite, and chemical absorbents such as the oxides and hydroxides of alkali metals and alkali earth metals. Because such a gas may be generated from core 2 for an extended period of time or enter through enveloping member 3, it cannot be prevented. However, using such absorbents allows the reliability to be ensured for an extended period of time.

In order for vacuum heat insulator 1 to exhibit excellent heat-insulating property, the appropriate average density of vacuum heat insulator 1 ranges from $100 \, kg/m^3$ to $240 \, kg/m^3$. At a density smaller than $100 \, kg/m^3$, it is difficult to be held as a mold. At a density larger than $240 \, kg/m^3$, overall high density increases solid heat conductivity and decreases heat-insulating property.

In sample 14, glass wool is mixed with core 2. Inorganic fibers other than glass wool can be used. Such inorganic fibers include alumina fiber, silica alumina fiber, silica fiber and the like as ceramic fibers. As glass fibers, fibrous glass, zirconia fiber, rock wool, calcium sulfate fiber, silicon carbide fiber, potassium titanate fiber, magnesium sulfate fiber, or other known material can be used without limitation. Preferable materials are alumina fiber, silica alumina fiber, silica fiber, glass wool, fibrous glass and the like, which have excellent affinity with silica having a hydroxyl group on its surface, because they have larger effects as an aggregate. Desirably, the surfaces of these fibers are not treated with phenol or the like.

A description is provided of a variation with long time of heat conductivity and flame retardance given by the effect of enveloping member 3 in the present embodiment. Similar to the first exemplary embodiment, every film in enveloping member 3 has flame retardance.

Heat conductivity of vacuum heat insulator 1 using these materials is measured to 0.004 W/mK. The heat conductivity after an acceleration test in which vacuum heat insulator 1 is left in an atmosphere at 150° C. for five years is measured to 0.010 W/mK. Even after five years, excellent heat-insulating property is maintained.

When flammability of the vacuum heat insulator is confirmed according to Test for Flammability of Plastic Materials for Parts in Devices and Appliance specified in UL94 safety standard, results equivalent to V-0 of this standard are obtained.

Because a material having a melting point of 200° C. or higher is selected, welded heat seal layer 5 does not melt even in a high-temperature atmosphere of 150° C. This selection of material can inhibit a decrease in gas-barrier property of heat seal layer 5 and deterioration of heat conductivity, and maintain heat-insulating performance of the vacuum heat-insulator for an extended period of time.

The melting points of gas-barrier layer 6 and protective layers 7 and 8 are higher than the melting point of heat seal layer 5. This structure prevents the materials from melting out when heat seal layer 5 is welded, and affecting the reliability of vacuum heat insulator 1 in the manufacturing process thereof. Especially in application to the products in high-temperature use, this structure can ensure stable quality as vacuum heat insulator 1. Further, as enveloping material 3 having a laminate structure, and as vacuum heat insulator 1, this structure renders flame retardance and improves the safety of vacuum heat insulator 1 during use.

The resin films used for heat seal layer 5 are not specified if they can be heat-welded at temperatures of 200° C. or higher. Desirable resin films are polyethylenenaphthalate having a melting point of 270° C. and a fluorocarbon resin film such as polychlorotrifluoroethylene having a melting point of 210° C., polyethyleneterephthalate having a melting point of 260° C., fluorocarbon resin films such as tetrafluoroethylene-ethylene copolymer having a melting point of 260° C., and tetrafluoroethylene-hexafluoropolypropylene copolymer having a melting point of 285° C. The polychlorotrifluoroethylene film is easy to use because of its low melting point among fluorocarbon films, and economical.

For gas-barrier layer 6, films having a melting point higher than that used in heat seal layer 5 and having metal foil, deposited metal or deposited inorganic oxide thereon can be used without any specification. A resin film having high gas-barrier property can also be used without any specification. For example, as a metal foil, an aluminum foil is often used. As metals into which low calories flow along the metal foil around the vacuum heat insulator, iron, nickel, platinum, tin, titanium, stainless and carbon steels can be used. As materials of deposited metal, aluminum, cobalt, nickel, zinc, cupper, silver or mixtures thereof can be used. As materials of deposited inorganic oxide, silica and alumina can be used. As resin films for the substrate of deposition, polyethylenenaphthalate and polyimide film can be used.

For protective layers 7 and 8, any film having a melting point higher than those of the films used for heat seal layer 5 can be used. Specifically, when a tetrafluoroethylene-ethylene copolymer having a melting point of 260° C. is used for heat seal layer 5, the materials usable for the protective layer include: tetrafluoroethylene-perfluoroalkoxyethylene copolymer having a melting point of 310° C.; tetrafluoroethylene having a melting point of 330° C.; and polyether-ketone having a melting point of 330° C. Polysulfone and polyetherimide can also be used.

In the above description, a vacuum heat insulator having a coating provided as radiation heat transfer suppressor 4 is used as an example. However, the structure of radiation heat transfer suppressor 4 is not limited to the above. Laminated inorganic materials in the second embodiment and metal films in the third embodiment can also be used as radiation heat transfer suppressor 4 with the similar effects.

Hereinafter, a description is provided of relations between the heat generation source and radiation heat transfer suppressor 4 in the first to fourth exemplary embodiments.

In the case where radiation heat transfer suppressor 4 for suppressing absorption of infrared rays in the outermost layer of vacuum heat insulator body 1A is provided, effects can be obtained only when the infrared rays reach the outermost layer. For this reason, in order to inhibit radiation heat transfer caused by infrared rays, it is important to dispose vacuum heat insulator 1 so that absorption of the infrared rays in the outermost layer can be inhibited.

Generally, radiation heat transfer is caused by absorption of infrared rays having wavelengths mainly ranging from 2 to 25 µm by a solid. Thus, it is important that the outermost layer of the sold has functions of suppressing the infrared rays and far infrared rays. However, when the heat generation source is in direct contact with radiation heat transfer suppressor 4, the heat energy conducts inside of the solid by solid heat conduction and thus the effect of suppressing radiation heat cannot be exerted.

Figure 7:
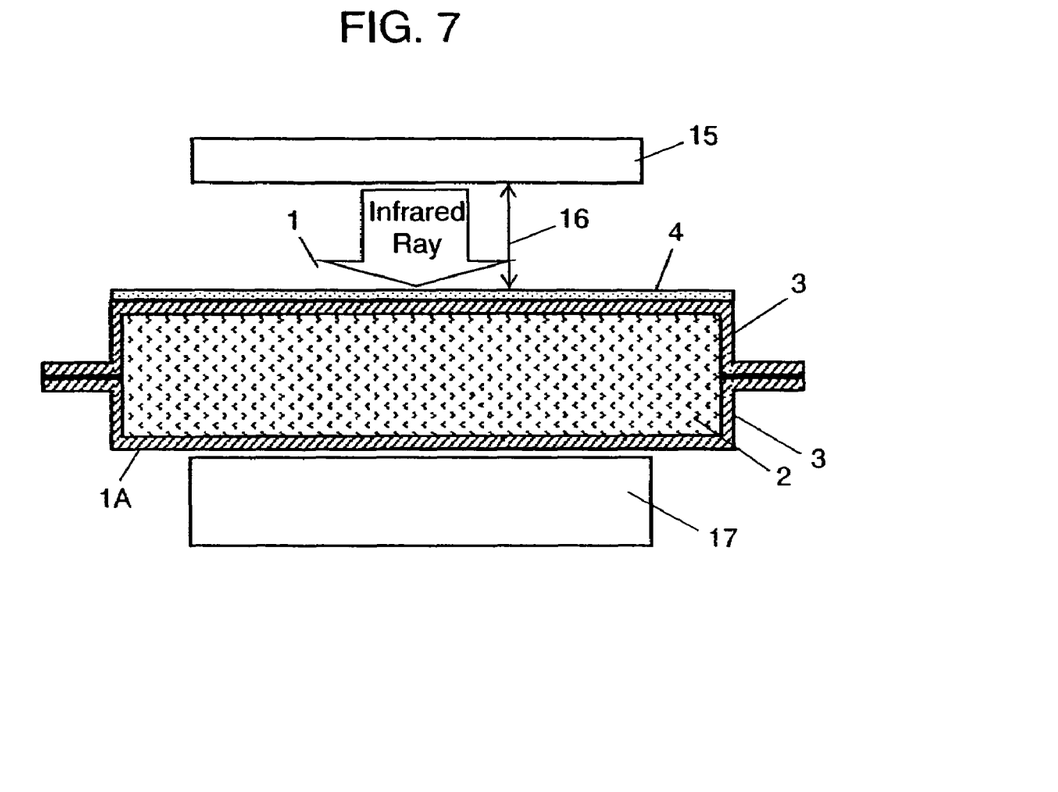
FIGS. 7 to 9 are sectional views showing positional relations between the vacuum heat insulator of FIG. 1 and heat generation source.

For this reason, it is preferable that space 16 for passing infrared rays is provided between heat generation source 15 and radiation heat transfer suppressor 4 as shown in FIG. 7. In other words, vacuum heat insulator body 1A is placed between object-to-be protected 17 and heat generation source 16; radiation heat transfer suppressor 4 is placed between body 1A and heat generation source 16. With this structure, the infrared rays from the heat generation source directly reaches radiation heat transfer suppressor 4 without being inhibited by another solid. As a result, heat energy does not make solid heat conduction from the other solid to radiation heat transfer suppressor 4, and radiation heat transfer suppressor 4 directly receives the infrared rays and does not absorb it as heat but reflects it. For this reason, the functions of inhibiting solid heat conduction and radiation heat transfer made to vacuum heat insulator body 1A provide excellent heat-insulating performance.

Figure 8:
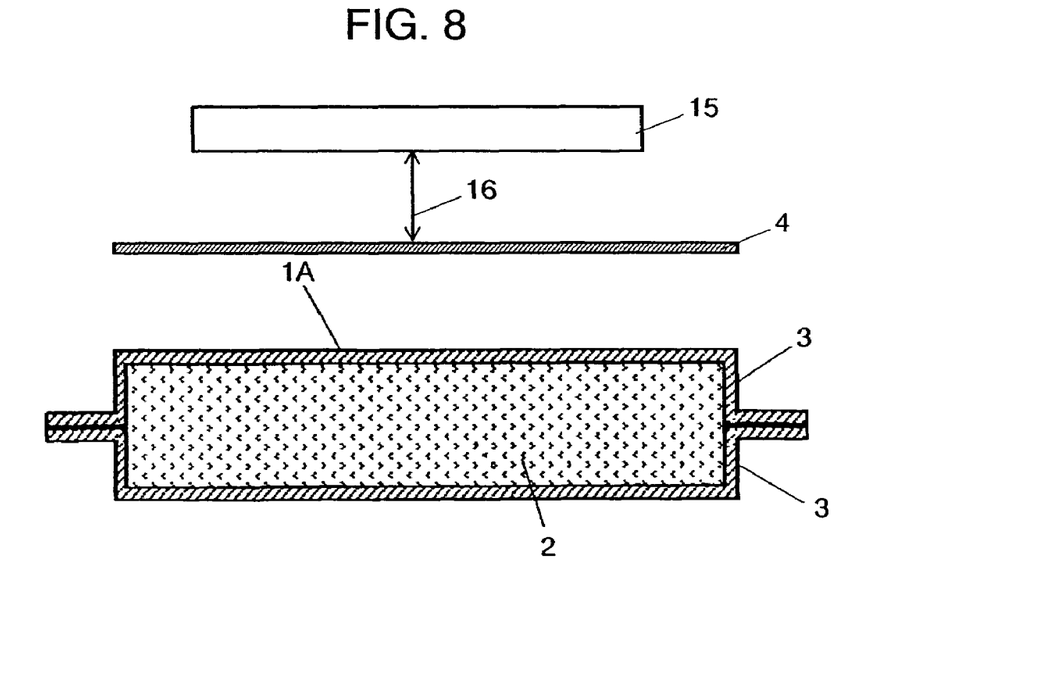
Figure 9:
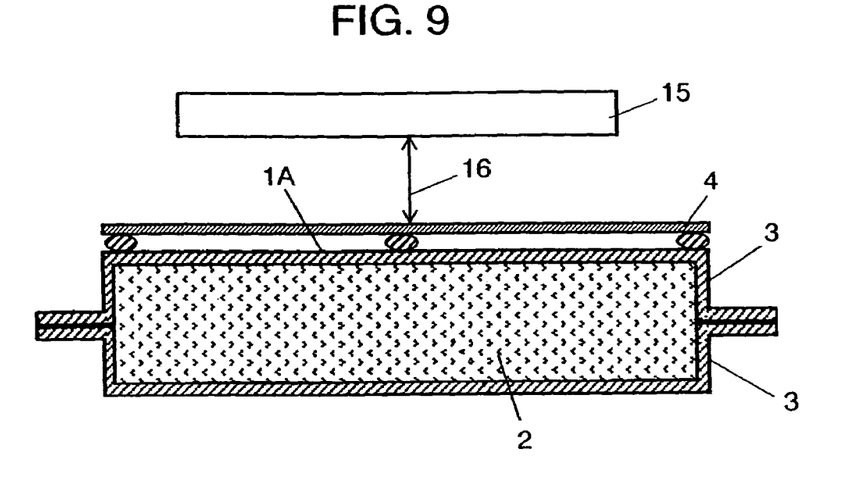

The location of radiation heat transfer suppressor 4 is not specifically limited, and it may be disposed between the surface of enveloping member 3 and heat generation source 16. As shown in FIG. 8, the radiation heat transfer suppressor can be disposed out of contact with the surface of the enveloping member. As shown in FIG. 9, the radiation heat transfer suppressor can be disposed in partial contact with the surface of the enveloping member.

To dispose the radiation heat transfer suppressor in partial contact with the surface of the enveloping member as shown in FIG. 9, irregularities can be provided on radiation heat transfer suppressor 4. Additionally, any bonding measures for adhesion, such as various kinds of organic or inorganic adhesives, hot melt, and double-faced tape, can be used.

Space 16 is effective if only a small space in which infrared waves propagate is maintained. The space can be set as required according to the relation between the temperature of heat generation source 15 and heat resistance of enveloping member 3. Space 16 is not only an air layer but can be various kinds of gases, such as argon, nitrogen, and carbon dioxide, or a vacuum.

Heat generation source 15 is not only a heater powered by electricity, gas, or the like, but any heat generation source responsible for the temperature gradient of the surface on the high-temperature side with respect to the surface on the low-temperature side of installed vacuum heat insulator 1. For example, in some applications of vacuum heat insulator 1, outdoor temperatures are included in heat generation source 15.

FIFTH EXEMPLARY EMBODIMENT

A description is provided of an electric kettle, as an example of a heat insulator in which the surface having radiation heat transfer suppressor 4 is faced to a heat generation source side.

Figure 10:
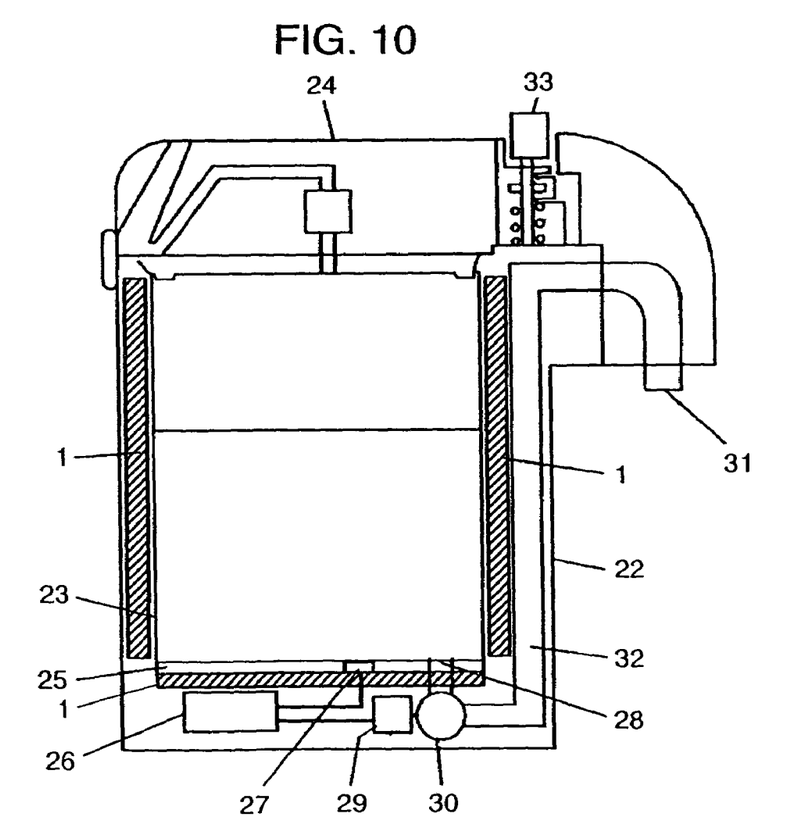
FIG. 10 is a schematic sectional view of an electric kettle in accordance with the exemplary embodiment of the present invention.

FIG. 10 is a sectional view of an electric kettle in accordance with the present embodiment. Electric kettle 22 has hot-water storage (herein after referred to as "storage") 23 for boiling water and storing hot water, and openable/closable lid 24 for covering the top surface thereof. Donut-shaped heater 25 is attached to the bottom surface of hot-water storage 23 in intimate contact therewith. Temperature sensor 27 senses the temperature of water. Control unit 26 receives signals from temperature sensor 27 to control heater 25 so that the temperature of the hot water can be maintained at a predetermined temperature. Hot-water pipe 32 communicates from water inlet 28, provided on the bottom, to water outlet 31. Depressing press button 33 activates pump 30 driven by motor 29 so that hot water comes out from the electric kettle.

On the side face of storage 23, vacuum heat insulator 1 having radiation heat transfer suppressor 4 on the side of storage 23 is wrapped. Also outside of heater 25 on the bottom face of storage 23, vacuum heat insulator 1 having radiation heat transfer suppressor 4 faced to the side of heater 25 is disposed. This structure inhibits escape of the heat of storage 23 and a decrease in the temperature of hot water. Vacuum heat insulator 1 has a structure shown in any one of the first to fourth embodiments.

In this structure, vacuum heat insulator 1 is disposed on the bottom face in which a conventional insulating material cannot be disposed because of the high temperature to insulate the heat. Vacuum heat insulator 1 effectively reflects infrared rays radiated from the heat radiation source, so that the power consumption is reduced by approx. 5%. The performance is maintained for a long period of time. In addition, on the bottom surface of the body, a space need not be provided for heat insulation. This reduces the volume below storage 23, thus making electric kettle 22 compact.

When vacuum heat insulator 1 is used as a heat-insulating member, it can be used for hot/cold insulation equipment requiring heat or keep warm in an operating temperature ranging from −30° C. to 150° C. It is useful for applications in equipment for generating heat in the same operating temperature range, such as a rice cooker, dish washer, electric kettle, automatic vendor, toaster, breadmaker, and induction heating (IH) stove. The vacuum heat insulator is also useful in a thin space, and for effective use by reduction of heat-insulating space. Further, it is also useful for not only electric equipment but also gas equipment, such as a gas stove.

SIXTH EXEMPLARY EMBODIMENT

A description is provided of a notebook type computer, as an example of using a heat-blocking member in which the surface having radiation heat transfer suppressor 4 of heat insulator 1 of the present invention is faced to the high-temperature side.

Figure 11:
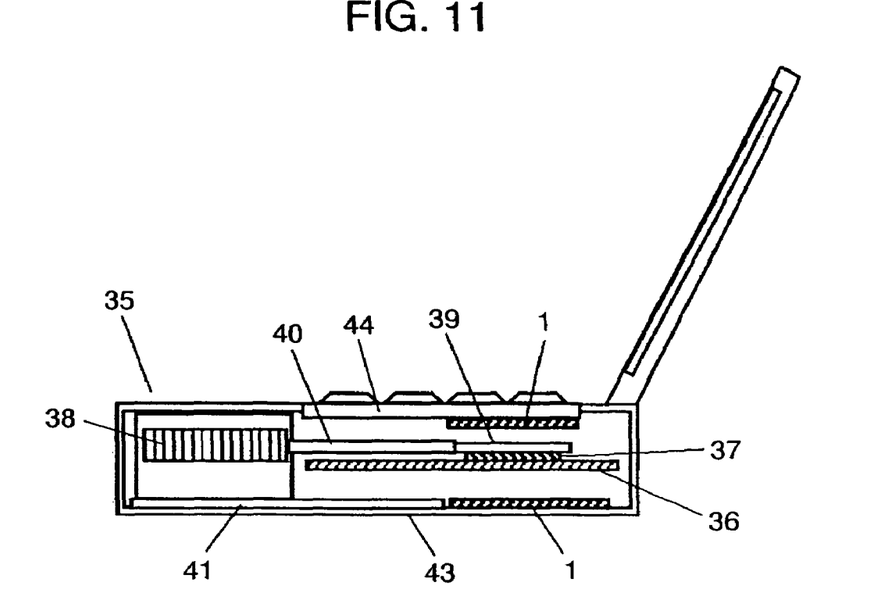
FIG. 11 is a schematic sectional view of a notebook type computer in accordance with the exemplary embodiment of the present invention.

FIG. 11 is a sectional view of a notebook type computer in accordance with the present embodiment. Notebook type computer (herein after referred to as "computer") 35 incorporates printed circuit board 36 having CPU 37 and other chips mounted thereon. Cooling unit 38 is provided to stabilize the performance of CPU 37, which reaches a considerably high temperature during operation. Cooling unit 38 has heat transfer block 39 in contact with CPU 37 and heat pipe 40 for heat transfer. Radiator plate 41 diffuses the inside heat and transfers it to bottom surface 43 of computer 35 to radiate the heat. Vacuum heat insulator 1 has any one of the above-mentioned structures of the first to fourth embodiments. Vacuum heat insulators 1 are attached to the inside of bottom surface 43 directly below CPU 37, and to the rear surface of keyboard 44 directly above CPU 37 with their radiation heat transfer suppressors 4 faced to the high temperature side by an adhesive in a manner to make intimate contact therewith.

This installation of vacuum heat insulators can decrease the temperatures by 8° C. at the maximum on bottom surface 43 and in high-temperature portions on the surface of keyboard 44 directly above CPU 37. In other words, radiation heat transfer suppressor 4 effectively reflects the infrared rays generated from the heat generation portion heated by CPU 37, such as heat transfer block 39, and inhibits the heat transfer. Vacuum heat insulator 1 having excellent heat-insulating performance in a high-temperature insulates the heat of solid heat conduction portion. Thus, abnormally heating a part of the surface of computer 35 and an uncomfortable feeling to the users can be prevented.

Additionally, because extremely thin radiation heat transfer suppressor 4 is provided on the surface of vacuum heat insulator 1 having a 2 mm-thick molded core, the vacuum heat insulator is suitable for applications in which the volume for heat insulation is limited, such as computer 35.

If enveloping member 3 is structured of the above-mentioned flame-retardant and heat-resistant materials, it is applicable to computer 35. This structure can prevent an uncomfortable feeling that is generated by a part of the surface of computer 35 abnormally heated for a long period of time while the safety of computer 35 is improved.

Vacuum heat insulator 1 can be used to heat-insulate and protect a hard disk drive and the like built in computer 35 from high temperatures. Vacuum heat insulator 1 is also applicable to products that require reduction in size and thickness in the limited space in which a heat-insulating member is used. For example, the heat insulator can be used for heat-insulation between the liquid crystal part in a car navigation system having a liquid crystal panel, and the part in which a CPU generates heat, and heat-insulation of the controller of a fluorescent lamp incorporating an inverter.

SEVENTH EXEMPLARY EMBODIMENT

A description is provided of a projector, as an example of using a heat-blocking member in which the surface having radiation heat transfer suppressor 4 of heat insulator 1 of the present invention is faced to the high-temperature side.

Figure 12:
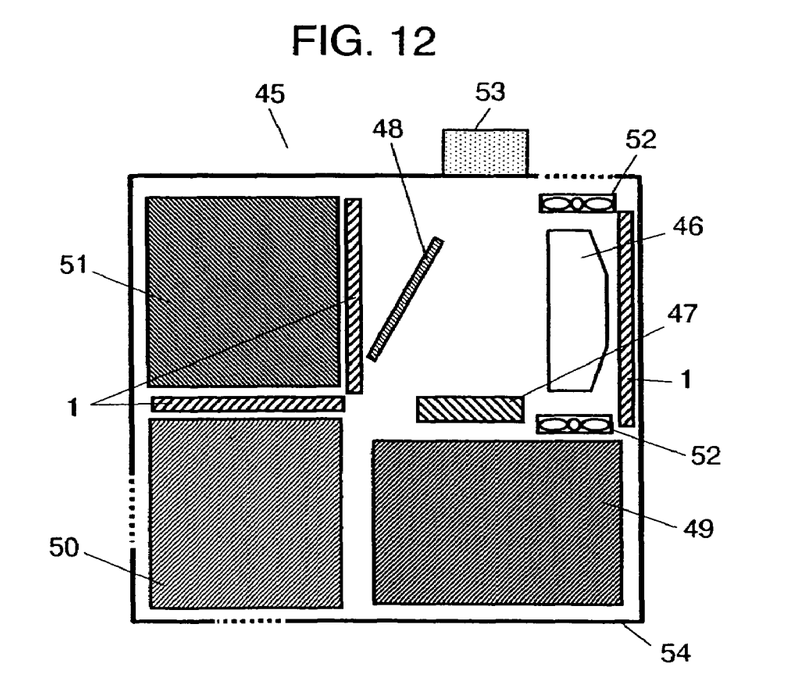
FIG. 12 is a schematic sectional view of a projector in accordance with the exemplary embodiment of the present invention.

FIG. 12 is a sectional view of a projector in accordance with the present embodiment. Projector 45 of a digital light processing (DLP) system is composed of lamp 46, digital micromirror device (DMD) element 47, color filter 48, ballast 49, power source board 50, control board 51, cooling fan 52, lens 53, and housing 54. The light emitted from lamp 46 is reflected onto color filter 48 and reaches DMD element 47 to project an image through lens 53.

Vacuum heat insulator 1 described in the first to fourth exemplary embodiments is disposed between lamp 46 and housing 54. This structure prevents the temperature increase of housing 54 even when the surface temperature of lamp 46 reaches 180° C. Vacuum heat insulators 1 are also disposed between color filer 48 and control board 51, and power source board 50 and control board 51. Vacuum heat insulator 1 reflects infrared rays generated from lamp 46 and power source board 50 and protects electronic circuit boards susceptible to heat. At that time, radiation heat transfer suppressor 4 is faced to lamp 46 and power source board 50, i.e. heat generation sources.

In the present embodiment, a DLP projector of 1-chip projection system is described. The same effects can be obtained in the 2-chip projection system and 3-chip projection system. The description is provided of a projector of the DLP system. The same effects can be obtained in a projector of a liquid crystal system.

EIGHTH EXEMPLARY EMBODIMENT

A description is provided of a printing machine, as an example of using a heat-blocking member in which the surface having the radiation heat transfer suppressor of the heat insulator of the present invention is faced to the high-temperature side.

Figure 13:
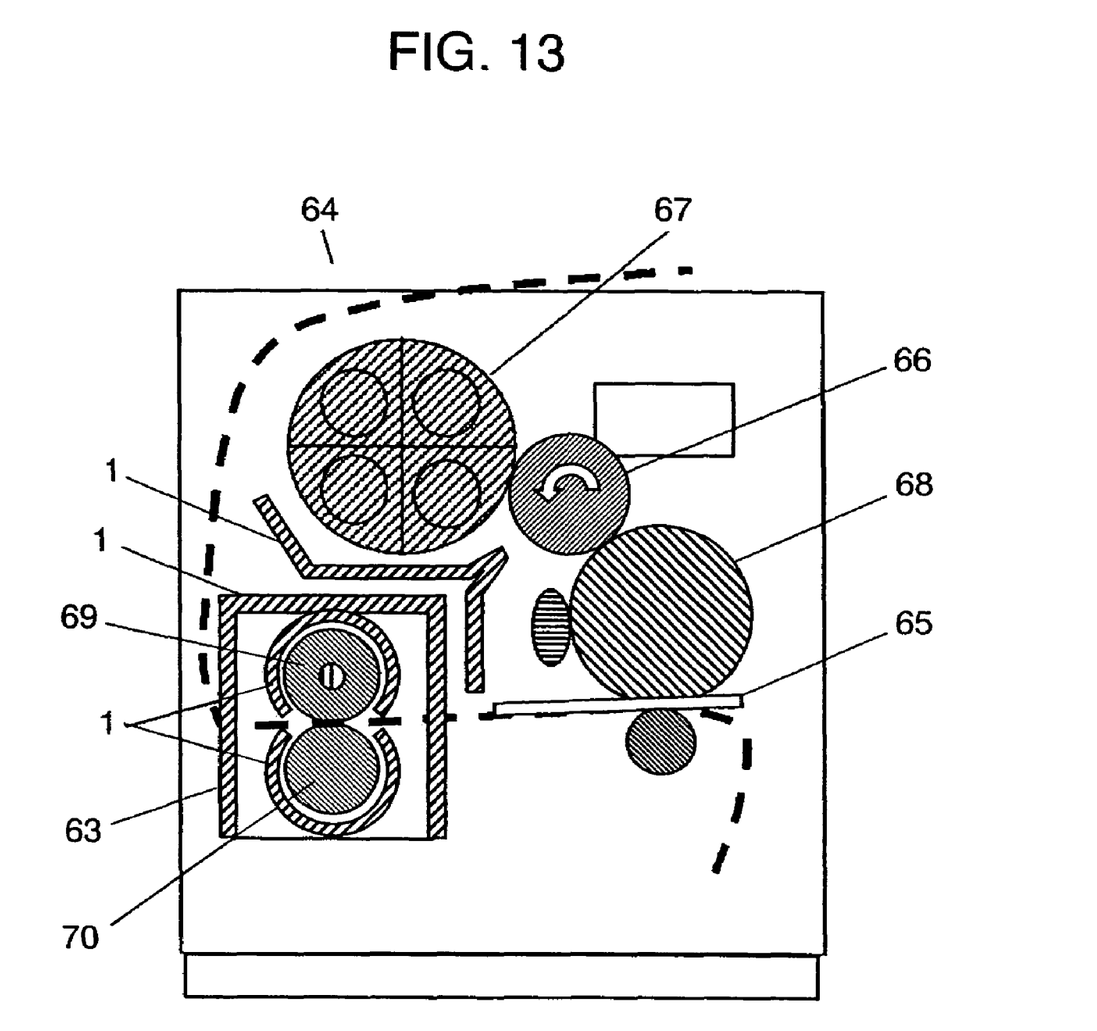
FIG. 13 is a schematic sectional view of a printing machine in accordance with the exemplary embodiment of the present invention.

FIG. 13 is a schematic sectional view of a printing machine in accordance with the present embodiment. Printing machine 64 including fixing unit 63 prints images onto recording paper 65. At this time, a static electric charge image is formed on the surface of photoconductor drum 66, and toner is adsorbed onto the image from toner storage 67. Then, the toner is transferred onto recording paper 65 via transfer drum 68. Recording paper 65 having the toner image transferred thereon is delivered into fixing unit 63, where recording paper 65 passes between heat-fixing roller 69 and press-contacting roller 70 both kept at high temperatures so that the toner is melted and fixed on the recording paper.

Around heat-fixing roller 69 and press-contacting roller 70, vacuum heat insulator 1 shown in the first to fourth exemplary embodiments is disposed in proximity thereto in order to maintain predetermined high temperatures. At this time, vacuum heat insulator 1 is formed into a cylindrical shape having a slit, and disposed so that radiation heat transfer suppressor 4 is on the high-temperature side. Placement of the vacuum heat insulator improves printing quality, reduces the time for start and restart, and power consumption.

Additionally, vacuum heat insulator 1 for blocking heat is disposed on the entire side walls and top surface of an outer frame of fixing unit 63 with radiation heat transfer suppressor 4 faced to the high-temperature side to prevent thermal effect on its environment. Vacuum heat insulators 1 can further be disposed to block the heat between fixing unit 63 and any one of toner storage 67, photoconductive drum 66 and transfer drum 68. Placement of vacuum heat insulators improves printing quality and keeps a controller (not shown) and a transfer unit including toner storage 67 and photosensitive drum 66, to temperatures up to 45° C., at which adverse effects are not given to toner, for a long period of time.

The vacuum heat insulator of the present invention can be used in the products in which a heat generation source up to 150° C. is need to be heat-insulated or kept warm other than the fixing units of a copying machine and laser printer, i.e. printing machines.

As described above, in equipment of the fifth to eighth exemplary embodiments, vacuum heat insulator 1 is used as a heat-blocking member with the surface of the vacuum heat insulator having radiation heat transfer suppressor 4 faced to the high-temperature side. Such placement can maintain heat-insulating performance during use for an extended period of time under relatively high-temperature conditions around 150° C., and provide excellent heat-insulating performance.

In the fifth to eighth exemplary embodiments, as described in the latter part of the fourth exemplary embodiment, it is preferable to provide a clearance between the heat generation source and radiation heat transfer suppressor 4. It is also preferable to produce vacuum heat insulator body 1A and radiation heat transfer suppressor 4 separately, and provide radiation heat transfer suppressor 4 between vacuum heat insulator body 1A and the heat generation source.

INDUSTRIAL APPLICABILITY

The vacuum heat insulator of the present invention has an excellent heat-insulating performance at relatively high temperatures around 150° C., and can be used while maintaining heat-insulating performance for an extended period of time. For this reason, providing the vacuum heat insulator in the important parts of various kinds of installations and office equipment, which need heat insulation or keep warm, contributes to energy saving, protection of components susceptible to heat, downsizing and improvement of the unit.

The invention claimed is:

1. A vacuum heat insulator comprising:
   a core;
   a gas-barrier enveloping member covering the core and having a depressurized inside; and
   a radiation heat transfer suppressor provided on at least one surface among external surfaces of the enveloping member,
   wherein the radiation heat transfer suppressor has a first inorganic material film, and a second inorganic material film having a reflectance different from that of the first inorganic material film, and the first inorganic material film and the second inorganic material film are alternately laminated with each other.

2. The vacuum heat insulator according to claim 1, wherein the first inorganic material film and the second inorganic material film are alternately laminated in a thickness of a quarter of a wavelength providing maximum emissivity at a heat-insulating temperature.

3. The vacuum heat insulator according to claim 1, wherein combination of the first inorganic material film and the second inorganic material film is any two selected from magnesium fluoride, calcium fluoride, lithium fluoride, barium fluoride, thallium bromo-iodide, thallium bromo-chloride, sodium chloride, potassium bromide, potassium chloride, silicon oxide, cesium iodide, and zinc selenide.

4. A vacuum heat insulator comprising:
   a core;
   a gas-barrier enveloping member covering the core and having a depressurized inside; and
   a radiation heat transfer suppressor provided on at least one surface among external surfaces of the enveloping member,
   wherein the radiation heat transfer suppressor includes a resin substrate and a metal film provided on the resin substrate, the resin substrate is a resin film having a melting point of at least 200 degrees C., and the resin film is a polyphenylene-sulfide film.

5. An apparatus comprising:
   a vacuum heat insulator having:
      a core; and
      a gas-barrier enveloping member covering the core and having a depressurized inside;
   a heat generation source; and
   a radiation heat transfer suppressor provided between the vacuum heat insulator and the heat generation source;
   wherein the radiation heat transfer suppressor has a first inorganic material film, and a second inorganic material film having a reflectance different from that of the first inorganic material film, and the first inorganic material film and the second inorganic material film are alternately laminated with each other.

6. The apparatus according to claim 5, wherein a space is provided between the heat generation source and the radiation heat transfer suppressor.

7. The apparatus according to claim 5, wherein the radiation heat transfer suppressor is formed on at least one surface among external surfaces of the enveloping member.

8. An apparatus comprising:
a vacuum heat insulator having:
  a core; and
  a gas-barrier enveloping member covering the core and having a depressurized inside;
a heat generation source; and
a radiation heat transfer suppressor provided on at least one surface among external surfaces of the enveloping member,
wherein the radiation heat transfer suppressor includes a resin substrate and a metal film provided on the resin substrate, the resin substrate is a resin film having a melting point of at least 200 degrees C., and the resin film is a polyphenylene-sulfide film.

* * * * *